3,005,838
6α,16α - DIMETHYL - 11 - OXYGENATED - 17α-
HYDROXY - UNSATURATED - PREGNANE-
3,20-DIONES
Frank H. Lincoln, Kalamazoo, William P. Schneider,
Kalamazoo Township, Kalamazoo County, and George
B. Spero, Kalamazoo, Mich., assignors to The Upjohn
Company, Kalamazoo, Mich., a corporation of Michigan
No Drawing. Filed Sept. 15, 1958, Ser. No. 760,849
1 Claim. (Cl. 260—397.45)

This invention relates to certain novel steroids, more particularly to 6α,16α-dimethyl-11β,17α-dihydroxy-1,4-pregnadiene-3,20-dione, 6α,16α - dimethyl - 11β,17α-dihydroxy-4-pregnene-3,20-dione, 6α,16α-dimethyl-9α-fluoro-11β,17α-dihydroxy-1,4-pregnadiene-3,20-dione, 6α,16α-dimethyl-9α-fluoro-11β,17α - dihydroxy - 4 - pregnene - 3,20-dione, the corresponding 9α-chloro compounds and the corresponding 11-keto compounds. These compounds and a process for their production may be represented by the following formulae:

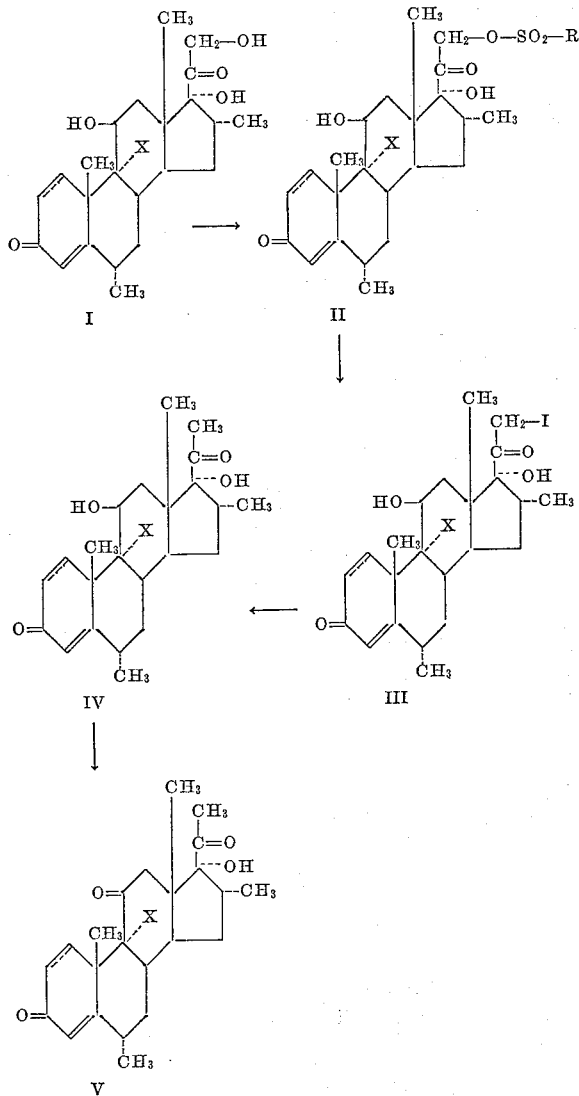

wherein X is a hydrogen, chlorine or fluorine atom, R is an aliphatic or aryl radical, preferably hydrocarbon containing from 1 to 12 carbon atoms, inclusive, e.g., tolyl or methyl, and the dotted line represents a Δ¹-double bond which may or may not be present, i.e., the formulae represent both the Δ⁴ and the Δ¹,⁴ compounds.

The novel compounds of this invention represented by Formula IV and the corresponding 11-keto compounds (V) are highly active anti-inflammatory agents with improved ratio of therapeutic activity to undesirable side effects, e.g., gastro-intestinal disturbances, salt retention, edema, etc., known to exist with similar known physiologically active steroids. These compounds are useful in the treatment of various inflammatory conditions of the skin, eyes, respiratory tract and the bones and internal organs of the animal organism due to bacterial or viral infections, contact dermatitis and allergic reactions. For this purpose, they may be administered in conventional dosage forms, e.g., pills, tablets, capsules, syrups or elixirs for oral use, liquid forms which are adaptable for injectable products, or topically in the form of ointments, creams, sprays, lotions and the like, with or without co-acting antibiotics, e.g., the penicillins, neomycin, tetracyclin, chloromycetin and novobiocin, or other materials forming advantageous combinations therewith.

The novel compounds of this invention (IV) are prepared from 6α,16α-dimethyl-11β,17α,21-trihydroxy-4-pregnene-3,20-dione, 6α,16α-dimethyl-11β,17α,21-trihydroxy-1,4-pregnadiene-3,20-dione and the corresponding 9α-fluoro and 9α-chloro compounds by esterifying the 21-hydroxy group of these compounds with a sulfonating agent, e.g., an alkyl or aryl, preferably hydrocarbon containing from 1 to 12 carbon atoms, inclusive, sulfonyl chloride or bromide, to produce the corresponding 21-sulfonate ester (II). The usual reaction conditions are employed, e.g., the steroid is dissolved in pyridine or an inert organic solvent containing pyridine or like amine and reacted with the hydrogen halide formed in the reaction, at preferably room temperature or below. The isolated 21-sulfonate ester is then reacted with an alkali-metal iodide to produce the corresponding 21-iodo compound (III). The 21-iodine atom is then removed from the steroid molecule by treatment with one of the usual reducing agents, e.g., sodium thiosulfate or other reducing agents known to remove an iodine atom, thus producing 6α,16α-dimethyl-11β,17α-dihydroxy-4-pregnene-3,20-dione, 6α,16α-dimethyl-11β,17α-dihydroxy-1,4-pregnadiene-3,20-dione, the corresponding 9α-fluoro and 9α-chloro compounds, respectively, (IV) depending upon the starting 21-hydroxy compound (I). The 11-keto compounds corresponding to each of the above compounds are prepared by oxidizing the 11β-hydroxy group with, e.g., chromic acid, N-haloamide or N-haloimide in pyridine or like amine.

The starting 6α,16α-dimethyl-11β,17α,21-trihydroxy-4-pregnene - 3,20-dione, 6α,16α-dimethyl-11β,17α,21-trihydroxy-1,4-pregnadiene-3,20-dione, the corresponding 9α-fluoro compounds and the corresponding 9α-chloro compounds are prepared from the known 16α-methylprogesterone (I) [Marker et al., J. Am. Chem. Soc., 64, 1280 (1942)], as shown in the preparations hereinafter, e.g., bioconversion of 16α-methylprogesterone with Rhizopus arrhizus according to the method of U.S. 2,602,769 to produce 11α-hydroxy-16α-methylprogesterone; esterification of the 11α-hydroxy group with acetic anhydride in pyridine to produce 11α-hydroxy-16α-methylprogesterone 11-acetate; ketalization of the 3 and 20 keto groups of either of these compounds with ethylene glycol according to methods well known in the art to produce the corresponding 3,20-bis-(ethylene ketal). The thus obtained diketal is then reacted with a peracid, e.g., peracetic, to produce the 5α,6α-oxide, i.e., 5α,6α-epoxy-11α-hydroxy-16α-methylallopregnane-3,20-dione 3,20-bis-(ethylene ketal) or 11-acetate; reacting one of these compounds with methyl lithium or methyl magnesium bromide to produce 5α,11α-dihydroxy - 6β,16α-methylallopregnane-3,20-dione 3,20-bis-(ethylene ketal). The ketal group is then hydrolyzed with acid to give 5α,11α-dihydroxy-6β,16α-dimethylallopregnane-3,20-dione. In the next step the 11-hydroxy group is oxidized, e.g., with chromic acid, sodium dichromate or an N-haloamide or N-haloimide in pyridine or like amine to give 5α-hydroxy-6β,16α-dimethylallopregnene-3,11,20-trione. This compound is converted with aqueous acid or base to 6α,16α-dimethyl-11-ketoprogesterone.

6α,16α-dimethyl-11-ketoprogesterone is converted to 3,11-diketo-6α,16α-dimethyl-4,7(20)-pregnadien - 21 - oic acid methyl ester according to the procedure of U.S. 2,790,814, i.e., reaction with over 2 molar equivalents each of sodium methoxide and methyl oxalate followed by acidification with acetic acid and then bromination with about 3 molar equivalents of bromine, followed by reaction with sodium methoxide to produce 2-bromo-3,11-diketo-6α,16α-dimethyl-4,17(20)-pregnadien-21 - oic acid methyl ester, whose 2-bromo group is then removed with zinc and acetic acid.

Conversion of 3,11-diketo-6α,16α-dimethyl-4,17(20)-pregnadien-21-oic acid methyl ester to 6α,16α-dimethyl-11β,21-dihydroxy-4,17(20)-pregnadien-3-one is accomplished in the manner described in U.S. 2,844,604, i.e., the 3-keto group is protected by conversion with pyrrolidine to a 3-enamine group and then reducing the 11-keto and 21-carbonyl groups with lithium aluminum hydride to produce the 3-pyrrolidyl enamine of 6α,16α-dimethyl-11β,21-dihydroxy-4,17(20)-pregnadien-3-one. The enamine group is then removed with aqueous base to produce 6α,16α-dimethyl-11β,21-dihydroxy-4,17(20) - pregnadien-3-one which is then esterified in the 21-position with acetic anhydride and pyridine under the usual esterification conditions to produce the corresponding 21-acetate. This latter compound is then oxidatively hydroxylated with asmium tetroxide and hydrogen peroxide, an amine oxide peroxide or aryl iodo oxide [U.S. 2,769,823; 2,769,825; Hogg et al., J. Am. Chem. Soc., 77, 4436 (1955)] to produce 6α,16α-dimethyl-11β,17α,21-trihydroxy-4-pregnene - 3,20 - dione 21-acetate. The corresponding Δ$^{1,4}$ compound is prepared by bioconverting 6α,16α - dimethyl - 11β,21-dihydroxy-4,17(20)-pregnadien-3-one with *Septomyxa affinis* to produce 11β,21-dihydroxy-1,4,17(20)-pregnatrien-3-one which is then esterified in the 21-position and the 17(20)-double bond oxidatively hydroxylated as described above to produce 6α,16α-dimethyl-11β,17α,21-trihydroxy-1,4-pregnadiene-3,20-dione 21-acetate. These two compounds are hydrolyzed with sodium bicarbonate under oxygen free conditions to produce the corresponding 21-hydroxy compounds (I, X=H).

The corresponding 9α-fluoro and 9α-chloro compounds (I, X=Cl, F), are prepared by reacting 6α,16α-dimethyl-11β,17α,21-trihydroxy-4-pregnene-3,20-dione 21 - acetate and 6α,16α-dimethyl-11β,17α,21-trihydroxy-1,4-pregnadiene-3,20-dione 21-acetate with, for example, an N-haloamide or N-haloimide and sulfur dioxide in pyridine, p-toluene-sulfonic acid or thionyl chloride, to produce the corresponding 9(11)-dehydro compounds. These compounds are then reacted with hypochlorous acid to produce 6α,16α-dimethyl-9α-chloro-11β,17α,21-trihydroxy-4-pregnene-3,20-dione 21-acetate and 6α,16α-dimethyl-9α-chloro-11β,17α,21-trihydroxy-1,4-pregnadiene-3,20 - dione 21-acetate, respectively. These compounds or the corresponding 9α-bromo compounds, prepared by substituting hypobromous acid for the hypochlorous acid above, are then reacted with a base, e.g., potassium acetate, to give the corresponding 9(11)-epoxy compounds which are converted with anhydrous or aqueous hydrogen fluoride, according to methods well known in the art, to 6α,16α-dimethyl-9α-fluoro-11β,17α,21-trihydroxy-4-pregnene-3,20-dione 21-acetate and 6α,16α-dimethyl-9α-fluoro-11β,17α,21-trihydroxy-1,4-pregnadiene-3,20-dione 21-acetate, respectively. Each of these 9α-halo-21-acetate compounds is then hydrolyzed with base, e.g., aqueous sodium bicarbonate under oxygen free conditions, to the corresponding 21-hydroxy compound (I, X=Cl, F).

Alternatively, the 9α-chloro and 9α-fluoro compounds represented by IV (X=Cl, F) are prepared by substituting the corresponding 21-desoxy compounds (IV, X=H) for the 21-acyloxy compounds, i.e., 6α,16α-dimethyl-11β,17α,21-trihydroxy-4-pregnene-3,20-dione 21-acetate and 6α,16α-dimethyl-11β,17α,21-trihydroxy-1,4-pregnadiene-3, 20-dione 21-acetate, in the series of reactions described in the preceeding paragraph.

The following examples and preparations are illustrative of the processes and products of this invention, but are not to be construed as limiting.

PREPARATION 1

*11α-hydroxy-16α-methylprogesterone*

To 16.6 l. of a fermentation medium consisting of 1.2% corn steep solids and 2% Cerelose glucose and adjusted to a pH of 4.8 to 5.0 was added an inoculum of *Rhizopus nigricans* (A.T.C.C. 6227b) and the medium incubated for 24 hours at a temperature of 28° C. with a rate of aeration of 5% air by volume per minute. To this medium was added 5 gm. of 16α-methylprogesterone [Marker et al., J. Am. Chem. Soc., 64, 1280 (1942)] dissolved in 35 ml. of acetone. After an additional 24 hours of incubation under the same conditions, the mycelium was filtered, washed twice, each time with a volume of acetone approximately equal to the volume of the mycelium and then twice with similar portions of methylene chloride. The combined extracts were added to the beer filtrate and the whole was extracted successively with 2 one-half by volume portions of methylene chloride and then with 2 one-fourth by volume portions of methylene chloride. These extracts were washed with 2 one-tenth by volume portions of 2% aqueous sodium bicarbonate and then with 2 one-tenth by volume portions of water. The methylene chloride extracts were then dried and the solvent removed by distillation. The residue was dissolved in 250 ml. of methylene chloride and chromatographed over a 500 gm. column of magnesium silicate (Florisil). The column was developed with 5 l. of methylene chloride, 5 l. of hexanes (Skellysolve B) plus 5% acetone, 10 l. of hexanes plus 10% acetone, 5l. of hexanes plus 25% acetone and 2 l. of acetone. The last 7 l. of hexanes plus 10% acetone, the hexanes plus 25% acetone and the first acetone eluates were combined, freed of solvent, redissolved in methylene chloride and rechromatographed over 400 gm. of magnesium silicate. The column was developed with 8 l. of hexanes plus 10% acetone, 8 l. of hexanes plus 15% acetone, 4 l. of hexanes plus 20% acetone, 4 l. of hexanes plus 25% acetone and 2.4 ml. of acetone, in that order. The combined residues from the last 4 l. of hexanes plus 10% acetone and the first 1.6 ml. of hexanes plus 15% acetone eluates were recrystallized twice from ethyl acetate to give 11α-hydroxy-16α-methylprogesterone melting at 161 to 163° C., having an [α]$_D$ of plus 149° (chloroform) and the analysis below.

*Analysis.*—Calculated for $H_{22}H_{32}O_3$: C, 76.70; H, 9.36. Found: C, 74.46; H, 9.63

PREPARATION 2

*11α-hydroxy-16α-methylprogesterone 3,20-bis-(ethylene ketal)*

A solution of 10 gm. of 11α-hydroxy-16α-methylprogesterone, 1 gm. of para-toluenesulfonic acid in 1,000 ml. of benzene and 150 ml. of ethylene glycol was refluxed for 6 hours using a water trap to remove the water formed in the reaction. The solution was cooled, water was added and the aqueous layer was separated and washed with ether and the ether extracts added to the organic layer. The combined organic layers were successively washed with 5% sodium bicarbonate solution, saturated sodium chloride solution, water and then dried over sodium sulfate. The solvents were removed by distillation and the thus-obtained residue was recrystallized from methanol to give 11α-hydroxy-16α-methylprogesterone 3,20-bis-(ethylene diketal).

Esterification according to the method of Preparation 13 gave 11α-hydroxy-16α-methylprogesterone 3,20-bis-(ethylene diketal) 11-acetate.

PREPARATION 3

*11α-hydroxy-16α-methylprogesterone 3,20-bis-(ethylene ketal) 11-acetate*

In the same manner as shown in Preparation 2, 6 gm. of 11α-hydroxy-16α-methylprogesterone 11-acetate, dissolved in 110 ml. of benzene and 11 ml. of ethylene glycol, was heated to reflux in the presence of 270 mg. of para-toluenesulfonic acid for a period of 18 hours to give 11α-hydroxy-16α-methylprogesterone 3,20-bis-(ethylene ketal) 11-acetate.

PREPARATION 4

*5α,6α-epoxy-11α-hydroxy-16-methylallopregnane-3,20-dione 3,20-bis-(ethylene ketal) 11-acetate*

To a suspension of 8.8 gm. of anhydrous sodium acetate in 88 ml. of 40% peracetic acid in an ice bath was added a solution of 44.2 gm. of 11α-hydroxy-16α-methylprogesterone 3,20-bis-(ethylene ketal) 11-acetate in 880 ml. of chloroform. The heterogeneous mixture was stirred vigorously for 2 hours at ice bath temperature. The mixture was diluted with 750 ml. of chloroform and the chloroform phase was separated, washed with 5% sodium bicarbonate, water, and evaporated to dryness under reduced pressure. The white solid residue was recrystallized from acetone to give 5α,6α-epoxy-11α-hydroxy-16α-methylallopregnane-3,20-dione 3,20-bis-(ethylene ketal) 11-acetate.

PREPARATION 5

*5α,6α-epoxy-11α-hydroxy-16α-methylallopregnane-3,20-dione 3,20-bis-(ethylene ketal)*

In the same manner as shown in Preparation 4, reacting 11α-hydroxy-16α-methylprogesterone 3,20-bis-(ethylene ketal) with peracetic acid and anhydrous sodium acetate in chloroform solution produced 5α,6α-epoxy-11α-hydroxy-16α-methylpregnane-3,20-dione 3,20-bis-(ethylene ketal).

PREPARATION 6

*5α,11α-dihydroxy-6β,16α-dimethylallopregnane-3,20-dione 3,20-bis-(ethylene ketal)*

To 5 ml. of 3 molar ether solution of methyl magnesium bromide was added dropwise a solution of 476 mg. of 5α,6α-epoxy-11α-hydroxy-16α-methylallopregnane-3,20-dione 3,20-bis-(ethylene ketal) 11-acetate in 20 ml. of distilled tetrahydrofuran. The reaction mixture was stirred and refluxed for 17 hours and was then cooled and 25 ml. of iced saturated ammonium chloride solution was added. After stirring for a few minutes the mixture was extracted with ether and the ether was washed with water, drived over anhydrous sodium sulfate and evaporated to dryness. The residue was crystallized from a mixture of acetone and hexanes (Skellysolve B) to give 5α,11α-dihydroxy-6β,16α-dimethylallopregnane-3,20-dione 3,20-bis-(ethylene ketal).

PREPARATION 7

*5α,11α-dihydroxy-6β,16α-dimethylallopregnane-3,20-dione*

A solution of 459 mg. of 5α,11α-dihydroxy-6β,16α-dimethylallopregnane-3,20-dione 3,20-bis-(ethylene ketal) in 10 ml. of acetone and 1 ml. of 1 N sulfuric acid was gently boiled on the steam bath for 10 minutes. The solution was cooled to room temperature, diluted with 20 ml. of water and then refrigerated. There was obtained a crystalline precipitate of 5α,11α-dihydroxy-6β,16α-dimethylallopregnane-3,20-dione.

PREPARATION 8

*5α-hydroxy-6β,16α-dimethylallopregnane-3,11,20-trione*

To a solution of 5 gm. of sodium dichromate dihydrate in 100 ml. of glacial acetic acid was added 10 gm. of 5α,11α-dihydroxy-6β,16α-dimethylallopregnane-3,20-dione in 150 ml. of acetic acid and the mixture was stirred for 1 hour at room temperature. The solution was then cooled to between 0 and 5° C. and 1.5 l. of ice and water was added with vigorous stirring. When addition was complete, 150 mg. of sodium sulfite was added and the solution was then maintained at between 0 and 5° C. overnight. The precipitated steroid was filtered and washed with water and then dried. There was thus obtained substantially pure 5α-hydroxy-6β,16α-dimethylallopregnane-3,11,20-trione which can be further purified by recrystallization from methylene chloride and methanol, after decolorization with charcoal.

PREPARATION 9

*6α,16α-dimethyl-11-ketoprogesterone*

To a stirred solution of 4.576 gm. of 5α-hydroxy-6β,16α-dimethylallopregnane-3,11,20-trione in 440 ml. of methanol in a nitrogen atmosphere was added a solution of 40 ml. of 0.1 N sodium hydroxide, similarly freed of air with nitrogen. The mixture was stirred under nitrogen for 16 hours and then made slightly acidic with glacial acetic acid. The solution was concentrated by distillation at reduced pressure to about 35 ml. There was thus obtained a precipitate of 6α,16α-dimethyl-11-ketoprogesterone which was filtered, washed with cold methanol and dried.

The corresponding 6β-isomer, i.e., 6β,16α-dimethyl-11-ketoprogesterone, is prepared by dehydrating with a mixture of N-bromoacetamide and sulfur dioxide in pyridine instead of sodium hydroxide. This compound is converted, according to the procedure of Preparation 10 to 3,11-diketo-6β,16α-dimethyl - 4,17(20)-pregnadien-21-oic acid methyl ester which, in turn, is converted to 6α,16α-dimethyl-11β,21-dihydroxy-4,17(20)-pregnadien-3-one.

PREPARATION 10

*6α,16α-dimethyl-3,11-diketo-4,17(20)-pregnadien-21-oic acid methyl ester*

A solution of 7.12 gm. (0.02 mole) of 6α,16α-dimethyl-11-ketoprogesterone in 70 ml. of tertiary butyl alcohol was prepared by heating to 55–60° with stirring under a nitrogen atmosphere. While the temperature was held at this point 11.7 gm. of ethyl oxalate was added. Thereafter 2.7 gm. of sodium methoxide in methanol (commercial 25% solution) was added. Almost immediately the yellow precipitate of the sodium dienolate of 6α,16α-dimethyl-2,21-diethoxyoxalyl-11-ketoprogesterone began to precipitate. The mixture was allowed to cool slowly to approximately 35° C. while stirring for 15 minutes.

A solution of 2.44 gm. of anhydrous sodium acetate and 3.00 gm. of glacial acetic acid in 160 ml. of methanol which had been previously cooled to 10° C. was then added and the mixture stirred until the solution was achieved. The yellow solution was cooled to 0° and to this vigorously stirred solution was added dropwise a precooled (0° C.) solution of 9.6 gm. of bromine in 96 ml. of methanol. Approximately 75 ml. of the bromine solution was added at a constant rate during 10 minutes. The rate of addition was then decreased and the remaining 21 ml. added during the following 10 minutes. After an additional ten-minute stirring period, the bromine color had essentially disappeared.

With continuous stirring and cooling a solution of 5.57 gm. of sodium methoxide in methanol (commercial 25% solution) was added rapidly. A bright orange color developed which soon faded to yellow amber. The cooling bath was removed, the temperature raised to 25–30° C. and the solution stirred for 1.5 hours.

16 ml. of acetic acid and 3.2 gm. of zinc dust was added to this material and stirring was continued for 30 minutes. The excess zinc dust was removed by filtration and washed with 15 to 20 ml. of fresh methanol. The combined filtrates were concentrated at reduced pressure in a 60° water bath to approximately 200 ml. The concentrate was poured slowly with stirring into 750 ml. of ice and water. The mixture was refrigerated for 15 minutes and then filtered. The filter cake was washed with 100 ml. of cold water and dried at room temperature to give 3,11-diketo-6α,16α-dimethyl-4,17(20)-pregnadien-21-oic acid methyl ester.

A 1.5 gm. portion of the crude material was dissolved in 50 ml. of benzene and poured onto a 75 gm. magnesium silicate (Florisil) chromatographic column. The column was eluted with 750 ml. of hexanes (Skellysolve B) plus 2% acetone, 1200 ml. of hexanes plus 5% acetone, 300 ml. of hexanes plus 10% acetone, and 150 ml. of 100% acetone. The eluate was collected in 150 ml. fractions and evaporated. The hexanes plus 5% acetone eluted 3,11 - diketo-6α,16α-dimethyl-4,17(20)-pregnadien-21-oic acid methyl ester which was freed of solvent by evaporation.

PREPARATION 11

*6α,16α-dimethyl-11β,21-dihydroxy-4,17(20)-pregnadien 3-one*

A solution of 0.5 gm. of 3,11-diketo-6α,16α-dimethyl-4,17(20)-pregnadien-21-oic acid methyl ester, 0.5 ml. of pyrrolidine, 40 ml. of benzene and 20 mg. of p-toluenesulfonic acid was heated under reflux for 1 hour. The solvent was distilled under vacuum. Trituration of the residue with methanol gave, as a yellow solid, the 3-pyrrolidyl enamine of 3,11-diketo-6α,16α-dimethyl-4,17(20)-pregnadien-21-oic acid methyl ester.

To a suspension of 1.1 gm. of lithium aluminum hydride in 75 ml. of anhydrous ether was added 1.3 gm. of the crude 3-pyrrolidyl enamine of 3,11-diketo-6α,16α-dimethyl-4,17(20)-pregnadien-21-oic acid methyl ester in 25 ml. of anhydrous ether. The reaction mixture was heated under reflux for 1 hour. The excess lithium aluminum hydride was destroyed by the addition of ethyl acetate. Water was added until a pasty mass of lithium salts were formed. The supernatant liquid was decanted and evaporated yielding a residue consisting essentially of the 3-pyrrolidyl enamine of 6α,16α-dimethyl-11β,21-dihydroxy-4,17(20)-pregnadien-3-one.

This residue was dissolved in 20 ml. of methanol containing 2 ml. of 5% aqueous sodium hydroxide. After 1.5 hours at 26° the solution was neutralized with acetic acid, the methanol distilled and the residue extracted with methylene chloride and the extracts chromatographed over magnesium silicate eluted with hexanes containing increasing proportions of acetone. Hexanes plus 20% acetone eluted 6α,16α - dimethyl-11β,21-dihydroxy-4,17(20)-pregnadien-3-one.

PREPARATION 12

*6α,16α-dimethyl-11β,21-dihydroxy-1,4,17(20)-pregnatrien-2-one*

2 gm. of corn steep liquor containing about 48% solids and 1 gm. of glucose were added to tap water to make 100 ml. of total liquid volume in a 250 ml. Erlenmeyer flask. The pH was adjusted to 4.8 with sodium hydroxide solution and the resulting material sterilized for 45 minutes at 15 pounds per square inch steam pressure. This medium was inoculated with *Septomyxa affinis* (A.T.C.C. 7637) and the inoculated flask then placed on a rotary shaker where incubation was allowed to proceed for 2 days with the flask being rotated around a one-half inch radius at approximately 330 r.p.m. A substrate of 10 mg. of 6α,16α-dimethyl-11β,21-dihydroxy-4,17(20)-pregnadien-3-one dissolved in a minimum amount of propylene glycol was introduced slowly with constant swirling of the flask to minimize precipitation of the steroid. 10 mg. of 3-ketobisnor-4-cholen-22-al as the bioconversion assistant was dissolved in 1 ml. of propylene glycol and added to the substrate-medium mixture. Bioconversion was then permitted to proceed for 4 days, the flask being shaken throughout this period. At the end of this time, the steroid fraction was extracted with methylene chloride. The extracts were washed twice with sodium bicarbonate solution and twice with water and then dried with sodium sulfate. The washed extract was freed of solvent and the residue was triturated with ether. The residue was crystallized from ethylene dichloride to give substantially pure 6α,16α-dimethyl-11β,21-dihydroxy-1,4,17(20)-pregnatrien-3-one.

PREPARATION 13

*6α,16α-dimethyl-11β,21-dihydroxy-4,17(20)-pregnadien-3-one 21-acetate*

A solution of 100 mg. of 6α,16α-dimethyl-11β,21-dihydroxy-4,17(20)-pregnadien-3-one in 1 ml. of pyridine and 1 ml. of acetic anhydride was maintained at room temperature for 17 hours. Crushed ice was added and the precipitate of 6α,16α-dimethyl-11β,21-dihydroxy-4,17(20)-pregnadien-3-one 21-acetate was extracted with 3 ten-milliliter portions of methylene chloride. The methylene chloride extracts were dried over anhydrous sodium sulfate, evaporated and the residue recrystallized from a mixture of ethyl acetate and hexanes to give 6α,16α-dimethyl-11β,21-dihydroxy - 4,17(20)-pregnadien-3-one 21-acetate.

Similarly, 6α,16α - dimethyl - 11β,21 - dihydroxy - 1,4,17(20)-pregnatrien-3-one is converted with acetic anhydride to 6α,16α-dimethyl-11β,21-dihydroxy-1,4,17(20)-pregnatrien-3-one 21-acetate.

PREPARATION 14

*6α,16α-dimethyl-11β,17α,21-trihydroxy-4-pregnene-3,20-dione 21-acetate*

100 mg. of 6α,16α - dimethyl - 11β,21 - dihydroxy-4,17(20)-pregnadien-3-one 21-acetate were dissolved in 6 ml. of tertiary butyl alcohol and 0.05 ml. of pyridine. To this mixture was added 1.6 mg. of osmium tetroxide and 0.8 mM. of N-methylmorpholine oxide peroxide in tertiary butyl alcohol. After stirring at 26° C. for 2 hours, excess sodium hydrosulfite solution was added. The solvent was distilled in a vacuum and the product extracted with methylene dichloride. The material was chromatographed over magnesium sulfate (Florisil) and the fraction consisting of hexanes (Skellysolve B) with 15% acetone was separated, and evaporated to give 6α,16α - dimethyl - 11β,17α,21 - trihydroxy - 4 - pregnene-3,20-dione 21-acetate.

Similarly, under exactly the same conditions, 6α,16α-dimethyl-11β,21-dihydroxy-1,4,17(20) - pregnatrien-3-one 21-acetate was oxidatively hydroxylated with osmium tetroxide and N-methylmorpholine oxide peroxide to 6α,16α-dimethyl-11β,17α,21-trihydroxy - 1,4-pregnadiene-3,20-dione 21-acetate.

PREPARATION 15

*6α,16α-dimethyl-11β,17α,21-trihydroxy-4-pregnene-3,20-dione*

A solution was prepared containing 0.5 gm. of 6α,16α-dimethyl-11β,17α,21-trihydroxy - 4 - pregnene - 3,20-dione 21-acetate in 25 ml. of methanol. This solution was purged with oxygen free nitrogen for a period of 5 minutes and then a similarly oxygen purged solution of 0.250 gm. of potassium bicarbonate dissolved in 1 ml. of methanol and 1 ml. of water was added. The mixture was maintained for 3 hours in a nitrogen atmosphere, then neutralized with hydrochloric acid, poured into 200 ml. of ice water and the thus-obtained mixture extracted with 4 fifty-milliliter portions of methylene chloride. The methylene chloride extracts were combined, washed several times with water, dried over anhydrous sodium sulfate and evaporated to give 6α,16α-dimethyl-11β,17α,21-trihydroxy-4-pregnene-3,20-dione.

Similarly, 6α,16α - dimethyl - 11β,17α,21 - trihydroxy-1,4-pregnadiene-3,20-dione 21-acetate was hydrolyzed with potassium bicarbonate to 6α,16α-dimethyl-11β,17α,21-trihydroxy-1,4-pregnadiene-3,20-dione.

PREPARATION 16

*6α,16α-dimethyl-17α,21-dihydroxy-4,9(11)-pregnadiene-3,20-dione 21-acetate*

To a solution of 8.5 gm. of 6α,16α-dimethyl-11β,17α,21-trihydroxy-4-pregnene-3,20-dione 21-acetate in 42.5 ml. of pyridine was added 5.63 gm. of N-bromoacetamide. After standing at room temperature for a period of 15 minutes, the reaction solution was cooled to 5 to 10° C. and sulfur dioxide gas was passed over the surface of the solution while shaking the flask until the solution gave no color with acidified starch-iodide paper. During the addition of the sulfur dioxide, the reaction mixture became warm. The temperature was kept below 30° C. by external cooling and by varying the rate of sulfur dioxide addition. Thereafter to the reaction mixture was added 400 ml. of ice water and the resulting precipitate collected by filtration. This material was recrystallized from a mixture of acetone and hexanes (Skellysolve B) to give 6α,16α - dimethyl - 17α,21 - dihydroxy - 4,9(11)-pregnadiene-3,20-dione 21-acetate.

Following the procedure of Preparation 16, but substituting 6α,16α-dimethyl-11β,17α,21-trihydroxy-1,4-pregnadiene-3,20-dione 21-acetate as the starting compound, there was thus produced 6α,16α-dimethyl-17α,21-dihydroxy-1,4,9(11)-pregnatriene-3,20-dione 21-acetate.

PREPARATION 17

*6α,16α-dimethyl-9α-bromo-11β,17α,21-trihydroxy-4-pregnene-3,20-dione 21-acetate*

To a solution of 5.68 gm. of 6α,16α-dimethyl-17α,21-dihydroxy-4,9(11)-pregnadiene-3,20-dione 21 - acetate in 100 ml. of methylene chloride and 250 ml. of tertiary butyl alcohol was added a solution of 14 ml. of 72% perchloric acid in 100 ml. of water followed by a solution of 2.34 gm. of N-bromoacetamide in 60 ml. of tertiary butyl alcohol. After stirring the reaction mixture for 15 minutes, a solution of 2.8 gm. of sodium sulfite in 140 ml. of water was added and the reaction mixture was concentrated to a volume of about 500 ml. under reduced pressure at about 50° C. The concentrate was cooled in an ice bath and while stirring 500 ml. of water was added. After stirring for a period of 1 hour, the precipitated product was isolated by filtration, and the cake washed with water and air-dried to give 6α,16α-dimethyl-9α-bromo - 11β,17α,21 - trihydroxy - 4 - pregnene-3,20-dione 21-acetate.

Following the procedure of Preparation 17, but substituting 6α,16α - dimethyl - 17α,21 - dihydroxy-1,4,9(11)-pregnatriene-3,20-dione 21-acetate as the starting compound, there was thus produced 6α,16α-dimethyl-9α-bromo-11β,17α,21-trihydroxy-1,4 - pregnadiene-3,20-dione 21-acetate.

Substituting N-chlorosuccinimide for the N-bromoacetamide in the reactions described in Preparation 17 is productive of the corresponding 9α-chloro compounds, i.e., 6α,16α-dimethyl-9α-chloro-11β,17α,21-trihydroxy-1,4-pregnadiene-3,20-dione 21-acetate and 6α,16α-dimethyl-9α-chloro-11β,17α,21-trihydroxy - 4 - pregnene-3,20-dione 21-acetate.

PREPARATION 18

*6α - 16α - dimethyl - 9β,11β - epoxy - 17α,21 - dihydroxy-4-pregnene-3,20-dione 21-acetate*

To a solution of 6.78 gm. of 6α,16α-dimethyl-9-bromo - 11β,17α,21 - trihydroxy - 4 - pregnene - 3,20 - dione 21-acetate in 175 ml. of acetone was added 6.78 gm. of potassium acetate and the resulting suspension was heated under reflux for a period of 17 hours. The mixture was then concentrated to approximately 60 ml. at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over 500 gm. of magnesium silicate (Florisil). The column was eluted with 1-liter portions of hexanes (Skellysolve B) containing increasing proportions of acetone. There was thus eluted 6α,16α-dimethyl - 9β,11β - epoxy - 17α,21α - dihydroxy - 4 - pregnene - 3,21-dione 21-acetate which was freed of solvent by evaporation of the eluates.

Following the procedure of Preparation 18, but substituting 6α,16α - dimethyl - 9α - bromo-11β,17α-21-trihydroxy-1,4-pregnadiene-3,20-dione 21-acetate as the starting compound, there was thus produced 6α,16α-dimethyl-9β,11β - epoxy - 17α,21 - dihydroxy - 1,4 - pregnadiene - 3,20-dione 21-acetate.

PREPARATION 19

*6α,16α - dimethyl - 9α - fluoro - 11β,17α,21 - trihydroxy - 4-pregnene-3,20-dione 21-acetate*

To approximately 1.3 gm. of hydrogen fluoride contained in a polyethylene bottle and maintained at minus 60° C. was added 2.3 ml. of tetrahydrofuran and then a solution of 500 mg. of 6α,16α-dimethyl-9β,11β-epoxy-17α,21-dihydroxy-4-pregnene-3,20-dione 21-acetate in 2 ml. of methylene chloride. The steroid solution was rinsed in with an additional 1 ml. of methylene chloride. The light red colored solution was then kept at approximately minus 30° C. for 1 hour and at minus 10° for 2 hours. At the end of this period it was mixed cautiously with an excess of cold sodium bicarbonate solution and the organic material extracted with additional methylene chloride. The combined extracts were washed with water, dried over anhydrous sodium sulfate and concentrated to approximately 35 ml. The solution was chromatographed over 130 gm. of magnesium silicate (Florisil). The column was developed with 260-ml portions of hexanes (Skellysolve B) containing increasing proportions of acetone. There was thus eluted 6α,16α-dimethyl - 9α - fluoro - 11β,17α,21 - trihydroxy - 4 - pregnene-3,20-dione 21-acetate which was freed of solvent by evaporation of the eluate fractions.

Following the procedure of Preparation 19, but substituting 6α,16α - dimethyl - 9β,11β - epoxy - 17α,21-dihydroxy-1,4-pregnadiene-3,20-dione 21-acetate as the starting compound, there was thus produced 6α,16α-dimethyl-9α - fluoro - 11β,17α,21 - trihydroxy - 1,4 - pregnadiene - 3,20-dione 21-acetate.

PREPARATION 20

*6α,16α - dimethyl - 9α - fluoro - 17α,21 - dihydroxy - 4 - pregnene-3,11,20-trione 21-acetate*

A solution of 1 ml. of acetic acid, 50 mg. of 6α,16α-dimethyl - 9α - fluoro - 11β,17α,21 - trihydroxy - 4 - pregnene-3,20-dione 21-acetate, 20 mg. of chromic anhydride and 1 drop (approximately 50 mg.) of water was shaken several times and then maintained at room temperature for 4 hours. Then, it was poured into 10 ml. of water and refrigerated for 20 hours at about 5° C. The steroid which separated from the aqueous mixture was collected on filter paper and dried to give 6α, 16α - dimethyl - 9α - fluoro - 17α,21 - dihydroxy - 4 - pregnene-3,11,20-trione 21-acetate.

Following the procedure of Preparation 20, but substituting 6α,16α - dimethyl - 9α - fluoro - 11β,17α,21-trihydroxy-1,4-pregnadiene-3,20-dione 21-acetate as the starting compound, there was thus produced 6α,16α-dimethyl - 9α - fluoro - 17α,21 - dihydroxy - 1,4 - pregnadiene - 3,11,20-trione 21-acetate.

PREPARATION 21

*6α,16α - dimethyl - 9α - fluoro - 11β,17α,21 - trihydroxy - 4-pregnene-3,20-dione*

3.25 gm. of 6α,16α-dimethyl-9α-fluoro-11β,17α,21-trihydroxy-4-pregnene-3,20-dione 21-acetate was dissolved in 325 ml. of methanol, previously urged of air-oxygen by passing nitrogen through it for 10 minutes and thereto was added a solution of 1.63 gm. of potassium bicarbonate in 30 ml. of water, similarly purged of oxygen. The mixture was maintained at room temperature for 5 hours in a nitrogen atmosphere and then neutralized with 2.14 ml. of acetic acid in 40 ml. of water. The mixture was concentrated to approximately one-third volume at reduced pressure on a 60° C. water-bath, 250 ml. of water was then added and the mixture chilled. The crystalline product was collected on a filter, washed with water and dried to give 6α,16α-dimethyl-9α-fluoro-11β,17α,21-trihydroxy-4-pregnene-3,20-dione.

Following the procedure of Preparation 21, but substituting 6α,16α - dimethyl - 9α - fluoro-11β,17α,21-trihydroxy-1,4-pregnadiene-3,20-dione 21-acetate as the starting compound, there was thus produced 6α,16α-dimethyl-9α - fluoro - 11β,17α,21 - trihydroxy - 1,4 - pregnadiene-3,20-dione.

Similarly, 6α,16α - dimethyl - 9α - fluoro - 17α,21-dihydroxy-4-pregnene-3,11,20-trione 21-acetate is hydrolyzed to 6α,16α - dimethyl-9α-fluoro-17α,21-dihydroxy-4-pregnene-3,11,20-trione and 6α,16α-dimethyl-9α-fluoro-17α, 21 - dihydroxy - 1,4 - pregnadiene - 3,11,20 - trione 21-acetate is hydrolyzed to 6α,16α - dimethyl - 9α-fluoro-17α,21 - dihydroxy - 1,4 - pregnadiene - 3,11,20 - trione. The corresponding 9α - chloro compounds are similarly prepared by hydrolysis of their 21-acetates, e.g., 6α,16α-dimethyl - 9α - chloro - 11β,17α,21 - trihydroxy - 1,4 - pregnadiene-3,20-dione and 6α,16α-dimethyl-9α-chloro-11β,17α,21 - trihydroxy - 4 - pregnene-3,20-dione are prepared from 6α,16α-dimethyl-9α-chloro-11β,17α,21-trihydroxy-1,4-pregnadiene-3,20-dione 21-acetate and from 6α, 16α - dimethyl - 9α - chloro - 11β,17α,21 - trihydroxy - 4-pregnene-3,20-dione 21-acetate, respectively.

EXAMPLE 1

*6α,16α - dimethyl - 11β,17α,21 - trihydroxy - 4 - pregnene-3,20-dione 21-methanesulfonate*

A solution was prepared containing 1 gm. (2.6 mM.) of 6α,16α - dimethyl-11β,17α,21-trihydroxy-4-pregnene-3, 20-dione in 7 ml. of pyridine. This solution was cooled to 0° C. and treated with 0.3 ml. of methanesulfonyl chloride. The solution was maintained at 0 to 5° C. for a period of 2 hours, after which it was diluted with water and extracted with 3 25-milliliter portions of methylene chloride. The extracts were combined, washed with cold dilute hydrochloric acid until the aqueous layer had a pH of 2 to 3, then washed again with cold sodium bicarbonate solution, water and finally dried over anhydrous sodium sulfate. Evaporation of the methylene chloride extract at reduced pressure left a residue of 6α, 16α - dimethyl - 11β,17α,21 - trihydroxy - 4 - pregnene - 3,20-dione 21-methanesulfonate.

Similarly, 6α,16α-dimethyl - 11β,17α,21 - trihydroxy-1,4-pregnadiene-3,20-dione, 6α,16α-dimethyl - 9α - fluoro-11β, 17α,21-trihydroxy-1,4-pregnadiene - 3,20 - dione, 6α,16α-dimethyl-9α-fluoro - 11β,17α,21 - trihydroxy-4-pregnene-3,20-dione, 6α,16α-dimethyl - 9α - chloro-11β,17α,21-trihydroxy-4-pregnene-3,20-dione and 6α,16α-dimethyl-9α-chloro-11β,17α,21 - trihydroxy-1,4-pregnadiene-3,20-dione are converted to 6α,16α-dimethyl-11β,17α,21-trihydroxy-1,4-pregnadiene - 3,20 - dione 21-methanesulfonate, 6α, 16α-dimethyl-9α-fluoro - 11β,17α,21 - trihydroxy-1,4-pregnadiene-3,20-dione 21-methanesulfonate, 6α,16α-dimethyl-9α-fluoro-11β,17α,21-trihydroxy - 4 - pregnene-3,20-dione 21-methanesulfonate, 6α,16α-dimethyl-9α-chloro-11β, 17α,21-trihydroxy-4-pregnene-3,20-dione 21-methanesulfonate and 6α,16α-dimethyl-9α-chloro-11β,17α,21-trihydroxy-1,4-pregnadiene-3,20-dione 21-methanesulfonate, respectively.

EXAMPLE 2

*6α,16α-dimethyl-11β,17α-dihydroxy-21-iodo-4-pregnene-3,20-dione*

The crude 6α,16α-dimethyl-11β,17α,21-trihydroxy-4-pregnene-3,20-dione 21-methanesulfonate described in Example 1 was dissolved in 15 ml. of acetone and treated with a solution of 1 gm. of sodium iodide in 10 ml. of acetone. The mixture was heated under reflux with stirring for a period of 15 minutes, the heat then reduced and the mixture concentrated to one-third volume at reduced pressure. Ice and water were added and the precipitated product collected on a filter, washed with water and dried to yield 6α,16α-dimethyl-11β,17α-dihydroxy-21-iodo-4-pregnene-3,20-dione.

Similarly, 6α-16α-dimethyl-11β,17α,21-trihydroxy-1,4-pregnadiene-3,20-dione 21-methanesulfonate, 6α,16α-dimethyl-9α-fluoro - 11β,17α,21 - trihydroxy-1,4-pregnadiene-3,20-dione 21-methanesulfonate, 6α,16α-dimethyl-9α-fluoro-11β,17α,21-trihydroxy-4-pregnene - 3,20 - dione 21-methanesulfonate, 6α,16α-dimethyl-9α-chloro-11β,17α,21-trihydroxy-4-pregnene - 3,20 - dione 21-methanesulfonate, and 6α,16α-dimethyl - 9α - chloro-11β,17α,21-trihydroxy-1,4-pregnadiene-3,20-dione 21-methanesulfonate are converted to 6α,16α-dimethyl-11β,17α-dihydroxy-21-iodo-1,4-pregnadiene-3,20-dione, 6α,16α-dimethyl - 9α - fluoro-11β, 17α-dihydroxy-21-iodo-1,4-pregnadiene - 3,20 - dione, 6α, 16α-dimethyl-9α-fluoro-11β,17α-dihydroxy - 21 - iodo-4-pregnene-3,20-dione, 6α,16α-dimethyl-9α-chloro-11β,17α-dihydroxy-21-iodo-4-pregnene-3,20-dione and 6α,16α-dimethyl-9α-chloro-11β,17α-dihydroxy-21-iodo - 1,4 - pregnadiene-3,20-dione, respectively.

EXAMPLE 3

*6α,16α-dimethyl-11β,17α-dihydroxy-4-pregnene-3,20-dione*

150 mg. of 6α,16α-dimethyl-11β,17α-dihydroxy-21-iodo-4-pregnene-3,20-dione was slurried with 5 ml. of acetic acid and stirred for a period of 45 minutes. Then an aqueous solution of 250 mg. of sodium thiosulfate pentahydrate was added causing the iodine color to disappear. Additional water was added (50 ml.) and the mixture extracted with 3 25-milliliter portions of methylene chloride. The methylene chloride extracts were combined, washed with water and cold sodium bicarbonate solution until the acetic acid was neutralized. After drying over anhydrous sodium sulfate, the solution was concentrated to approximately 15 ml. and chromatographed over 10 gm. of magnesium silicate (Florisil). The column was developed with hexanes containing increasing proportions of acetone, to give substantially pure 6α,16α-dimethyl-11β,17α-dihydroxy - 4 - pregnene-3,20-dione.

Following the procedure of Example 3, 6α,16α-dimethyl-11β,17α-dihydroxy-21-iodo - 1,4 - pregnadiene-3, 20-dione was converted to 6α,16α-dimethyl-11β,17α-dihydroxy-1,4-pregnadiene-3,20-dione.

Similarly, 6α,16α-dimethyl - 9α - fluoro-11β,17α-dihydroxy-21-iodo-1,4-pregnadiene-3,20-dione, 6α,16α-dimethyl-9α-fluoro-11β,17α-dihydroxy - 21 - iodo-4-pregnene-3, 20-dione, 6α,16α-dimethyl-9α-chloro-11β,17α-dihydroxy-21-iodo-4-pregnene-3,20-dione and 6α,16α-dimethyl-9α-chloro-11β,17α-dihydroxy-21-iodo - 1,4 - pregnadiene-3, 20-dione were converted to 6α,16α-dimethyl-9α-fluoro-11β,17α-dihydroxy-1,4-pregnadiene - 3,20 - dione, 6α,16α-dimethyl-9α-fluoro-11β,17α-dihydroxy - 4 - pregnene-3,20-dione, 6α,16α-dimethyl-9α-chloro - 11β,17α - dihydroxy-4-pregnene-3,20-dione and 6α,16α-dimethyl-9α-chloro-11β, 17α-dihydroxy-1,4-pregnadiene-3,20-dione, respectively.

EXAMPLE 4

6α,16α-dimethyl-17α-hydroxy-4-pregnene-3,11,20-trione

A mixture was prepared containing 0.3 gm. of 6α,16α-dimethyl-11β,17α-dihydroxy-4-pregnene-3,20-dione, 100 mg. of chromic anhydride, 10 ml. of glacial acetic acid and one-half ml. of water. This mixture was stirred and thereupon maintained for 8 hours at room temperature. Thereafter the mixture was poured into 50 ml. of ice water, neutralized by the addition of dilute sodium hydroxide and the thus-obtained precipitate collected on a filter and dried to give 6α,16α-dimethyl-17α-hydroxy-4-pregnene-3,11,20-trione.

Following the procedure of Example 4, 6α,16α-dimethyl-11β,17α-dihydroxy-1,4-pregnadiene-3,20-dione was oxidized to 6α,16α-dimethyl-17α-hydroxy-1,4-pregnadiene-3,11,20-trione. Similarly, 6α,16α-dimethyl-9α-fluoro-11β,17α-dihydroxy-1,4-pregnadiene-3,20-dione, 6α,16α-dimethyl-9α-fluoro-11β,17α-dihydroxy-4-pregnene-3,20-dione, 6α,16α-dimethyl-9α-chloro-11β,17α-dihydroxy-4-pregnene-3,20-dione and 6α,16α-dimethyl-9α-chloro-11β,17α-dihydroxy-1,4-pregnadiene-3,20-dione were converted to 6α,16α-dimethyl-9α-fluoro-17α-hydroxy-1,4-pregnadiene-3,11,20-trione, 6α,16α-dimethyl-9α-fluoro-17α-hydroxy-4-pregnene-3,11,20-trione, 6α,16α-dimethyl-9α-chloro-17α-hydroxy-4-pregnene-3,11,20-trione and 6α,16α-dimethyl-9α-chloro-17α-hydroxy-1,4-pregnadiene-3,11,20-trione, respectively.

We claim:

6α,16α-dimethyl-9α-fluoro-11β,17α-dihydroxy-1,4-pregnadiene-3,20-dione.

References Cited in the file of this patent

UNITED STATES PATENTS

| | | |
|---|---|---|
| 2,867,632 | Lincoln et al. | Jan. 6, 1959 |
| 2,867,633 | Lincoln et al. | Jan. 6, 1959 |
| 2,867,637 | Lincoln et al. | Jan. 6, 1959 |
| 2,867,638 | Lincoln et al. | Jan. 6, 1959 |

OTHER REFERENCES

Arth et al.: J. Am. Chem. Soc., vol. 80, pages 3160–62 (June 1958).